United States Patent
Riesberg

Patent Number: 5,497,593
Date of Patent: Mar. 12, 1996

[54] SYSTEM FOR INTERLOCKING PERPENDICULAR MEMBERS

[76] Inventor: James J. Riesberg, 5873 Patterson Dr., Troy, Mich. 48098

[21] Appl. No.: 15,418

[22] Filed: Feb. 9, 1993

[51] Int. Cl.$^6$ ........................................ E04B 1/38
[52] U.S. Cl. .................. 52/702; 403/232.1; 52/182
[58] Field of Search ................ 52/188, 182, 480, 52/698, 702; 403/231, 256, 260, 258, 405.1, 232.1; 248/188.8

[56] References Cited

U.S. PATENT DOCUMENTS

| | | |
|---|---|---|
| 1,346,736 | 7/1920 | Allee ................................ 403/231 X |
| 1,523,372 | 1/1925 | Hoerr . |
| 2,014,451 | 9/1935 | Pfeifer, Jr. . |
| 2,307,149 | 1/1943 | Milz et al. . |
| 2,345,419 | 3/1944 | Olson . |
| 2,520,231 | 8/1950 | Anderson .............................. 403/231 |
| 3,017,673 | 1/1962 | Biris, Jr. . |
| 3,456,412 | 7/1969 | Decombas . |
| 3,669,479 | 6/1972 | Payne ................................ 403/231 X |
| 3,966,056 | 6/1976 | Larson ................................... 211/134 |
| 4,301,636 | 11/1981 | Luria .............................. 403/405.1 X |
| 4,359,851 | 11/1982 | Daniels .................................. 52/298 |
| 4,423,977 | 1/1984 | Gilb ................................. 52/702 X |
| 4,589,792 | 5/1986 | Niziol ................................ 403/231 X |
| 4,690,359 | 9/1987 | Phillips . |
| 4,706,925 | 11/1987 | Brumbalough ........................... 52/182 |
| 4,709,520 | 12/1987 | Vochatzer ............................. 52/182 X |
| 4,757,653 | 7/1988 | Anderholm ............................... 52/182 |
| 4,888,926 | 12/1989 | Lutz, III . |
| 4,932,173 | 6/1990 | Commins ................................. 52/92 |
| 4,965,980 | 10/1990 | Leavens ................................. 52/712 |
| 4,973,187 | 11/1990 | Sauder ............................. 403/231 X |
| 5,071,280 | 12/1991 | Turner ............................... 52/702 X |
| 5,160,211 | 11/1992 | Gilb .................................. 52/702 X |

Primary Examiner—Carl D. Friedman
Assistant Examiner—Beth A. Aubrey
Attorney, Agent, or Firm—Harness, Dickey & Pierce

[57] ABSTRACT

A system to join two substantially perpendicular members tightly together. The system finds particular application where it is desired to secure a subfloor to an underlying joist to eliminate squeaking and to rectify a "spongy" floor through reinforcement. The system comprises a brace and a pair of screws of different lengths. The brace includes a pair of working surfaces that meet to form a ninety-degree corner. A flange extends from one of the working surfaces for placement between the top side of the joist and the bottom side of the subfloor. The brace has a pair of parallel pilot holes defined therein for receiving the two screws. The pilot holes are disposed at about a thirty-degree angle relative the joist-mating working surface.

19 Claims, 2 Drawing Sheets 5,497,593

SYSTEM FOR INTERLOCKING PERPENDICULAR MEMBERS

BACKGROUND OF THE INVENTION

I. Field of the Invention

The present invention relates generally to a system used in construction of buildings and the like. More particularly, the present invention relates to a system used to join two substantially perpendicular members together squeaking and movement of an overlying member relative to the underlying, supporting member.

II. Description of the Prior Art

It is very common to have two substantially perpendicular members joined in the construction of homes and other buildings. This type of assembly may, for example, be commonly found in floors, where one or more sheets of wood flooring, such as sheet plywood or particle board, are laid over a series of floor joists. Wood planking is still occasionally used. Whatever the composition, the wood or wood composite overlying the joists is known as the subfloor. Tile, sheet vinyl, carpeting, or finish flooring is then laid over the subfloor. The joists themselves are commonly supported by a foundation composed of materials such as block or poured cement. A beam, such as an I-beam, may be used to provide additional support for the joists.

Most commonly the overlying wood is simply nailed to the joists with flooring nails. However, over time, the wood subfloor becomes separated from the joists either through warpage or shrinkage and is raised somewhat above the joists. Two common problems result. First, the floors tend to squeak when walked upon in response to weight being placed upon the "spongy" subfloor. The squeak results when the wood surrounding the nail rubs against the shank of the nail in response to the weight. Second, the movement of the "spongy" subfloor causes grout between ceramic tile to crack and to become separated from the tiles.

The problem described is as old as subfloor and joist construction. Many approaches to resolving the problem of squeaking floors are known. The most direct approach to the problem is to refasten the subflooring to the underlying joists by nailing or screwing the floors back in place. However, this most direct approach is also the least practical in the event where a permanent subfloor-covering material such as tile or linoleum is in place. This method is also not very practical where a semi-permanent subfloor-covering material such as carpet is in place. It is simply not possible to renew the attachment of the subflooring to the joists without first removing or replacing the finish flooring.

The remainder of the known approaches attempt to resolve the problem from beneath the subfloor through entry from, for example, the basement or crawl space.

The apparently easiest cure for squeaking floors has been to insert a tapered wedge between the joist and subfloor. Typically, these wedges are made from a soft wood and are sold several to a pack. This approach does provide temporary relief from squeaking by filling the void between the top surface of the joist and the bottom surface of the subfloor. This approach, however, only attacks the symptoms but not the cause of floor squeaking, in that the wedge only serves to further separate the two pieces in the vicinity immediately adjacent the insertion point. Frequent maintenance of driving the wedge deeper may resolve the problem but, again, the solution is only temporary.

Another possible approach taken toward resolution of the squeaking problem is to refasten the subfloor to the joist by toe nailing the subfloor through the joist. However, this approach is not very effective for a variety of reasons. First, a nail does not function well if its head is not flush with the surface of the board through which it is nailed. Second, to be effective at all, the nail must fully penetrate the wood it is intended to fasten. This is not always easy to achieve where the work is being done blind with limited knowledge as to the thickness of the subfloor and other features.

Third, the inserted nail may cleanly pass through the joist, but may result in the further separation of the subfloor from the joist if the point of the nail pushes against the subfloor without penetrating its surface or with only minimal penetration. The opposite problem is the fourth problem where a nail may be too long and may pass completely through the subfloor and exit through the finish flooring, resulting in obvious problems. Again, this is a very possible result where the repair is being done blind. This problem is compounded because joists are typically composed of soft woods, and the nail (or a screw) often countersinks itself. Again, the result is the pointed end of the nail exiting through the finish flooring material.

As an alternative to toe nailing, a wooden backer board is occasionally placed in the corner created at the juncture of the joists and the subfloor. The backer board is placed parallel to the joist. Once in position, the board is nailed to the joist. However, the board is not nailed to the underside of the subfloor, and the problem is little resolved because there is no direct attachment at the critical place.

A more elaborate method is known which involves the use of hardware, usually in the form of a strap-type bracket and one or more screws or bolts. The bracket is placed over the bottom side of the joist and the bracket pulls the joist against the underside of the subfloor by a nut and bolt fastener. This system is disclosed in U.S. Pat. No. 4,888,926, issued on Dec. 26, 1989, to Lutz and entitled "Floor Squeak Eliminator". This patent discloses a floor squeak eliminator that comprises a joist strap for fitting on the underside of the joist and a downwardly projecting threaded member secured to the underside of the subfloor. A nut engages the threads of the downwardly projecting member and draws the subfloor to the joist.

However, this system is characterized by a number of problems. First is the problem of the complexity of the system which requires nearly half-a-dozen parts and several steps for installation and adjustment. The second problem relates to the bracket which is a flat strap of metal. Upon turning down the nut, the metal may stretch or bend, thus requiring readjustment of the nut. The third problem is that the bracket must wrap around the base and both sides of the bottom end of the joist to be effective. This requirement is a problem if the joist is a part of a cold air return of a forced air home heating system. In such a system the duct of the cold air return is formed in part by a sheet of metal being placed over the bottom emds of two side-by-side joists.

Accordingly., the known systems of drawing together two substantially perpendicular members, particularly joists and subfloors, have failed to provide either effective or practical answers to the problem of squeak elimination.

SUMMARY OF THE PRESENT INVENTION

The present invention provides a system for securely and conveniently drawing together the top surface of a joist against the bottom surface of an adjacent subfloor. The system of the present invention may also be used in bracing a stair step. The system comprises a brace and fasteners for attaching the brace to the wooden components. The brace is preferably composed of metals such as steel or aluminum, or may be composed of a polymerized material, such as a plastic. The brace's working surfaces comprise a pair of surfaces that meet to form a ninety-degree angle. These working surfaces mate with one side of the joist and an area of the bottom of the subfloor adjacent to the joist. The ninety-degree construction of the brace enables it to meet flush with the intersection of the joist and subfloor requiring attention.

A flange extends from one of the working surfaces of the brace. The flange fits between the top side of the brace and the bottom side of the subfloor. The flange fills any space between the top side of the joist and the bottom side of the subfloor created by warpage or shrinkage of the subfloor. This type of space is typically found where there is a squeaky or weak, "spongy" floor. Because the flange is fitted horizontally with respect to the subfloor, the flange also aids in positioning the brace against the joist during installation.

Two anchoring screws are provided for interlocking the brace with the joist and the subfloor. The screws are of different lengths. The shorter screw goes through part of the brace and into the subfloor. The longer screw goes through part of the brace, through part of the joist, and into the subfloor. Both screws are parallel to one another and are disposed at about a thirty-degree angle with respect to the subfloor. The screws are countersunk in the braces.

The combination of the brace with its cantilevered flange and the screws acts as a strengthening member to draw the joist and subfloor together, thereby acting as a reinforcing brace. The pre-bored screw holes provide that angle which maximizes the grip of the screws. The angled entry of the screws into the joist and subfloor prevents separation of the subfloor from the joist once the system is in place. The angle of the screws permits the maximum amount of screw material to be driven into the wooden components without the point of the screws emerging through the covering material of the floor.

Because the flange is disposed about the joist, the short screw and flange combination also acts to prevent the brace from pulling loose from the longer screw. In addition, because the flange holds the brace firmly in place during installation, the brace does not shift when the screws are being installed.

With particular respect to the shorter screw, the angle is also important for compactness of the brace construction. The pilot hold for the short screw is defined in the inner corner region of the brace just adjacent the outer corner created at the intersection of the working surfaces. If the screw were instead to be driven perpendicular to the subfloor, the design of the brace would have to allow for this difference, and the brace would need to be wider at the top. Not only would this make the brace more cumbersome, but it would also weaken the integrity of the brace.

With particular respect to the longer screw, the pilot hole has a prescribed angle that allows the anchoring screw to enter the joist at a certain point and at a certain angle so that the top of the screw exits at the approximate center of the top side of the joist. This central exiting of the joist is critical because it is at this point that the longer screw will have the maximum holding power while minimizing the risk of exiting a corner of the joist and causing splintering.

The combination of the brace and its associated flange with the two precisely angled screws provides a useful system for drawing two perpendicular components together to thereby eliminate squeaks caused, for example, when subflooring becomes separated from joists.

This system overcomes the deficiencies of the prior art. Specifically, the flange of the present system is an improvement over wedges because the flange is not wedge-shaped, but is radiused to minimize lifting. In addition, because the brace is composed of a harder substance than the adjacent soft wood, the flange may become embedded in the joist if the thickness of the flange is greater than the space between the components. This embedding is the result if the joist wood is soft enough. However, if the wood is too hard to allow for the flange to become embedded, the presence of the flange sandwiched between the top of the joist and the underside of the subfloor adds only a marginal height to the subfloor that cannot be noticed from above.

The present system is also superior to toe nailing because a correct angle and a correct depth is achieved without guesswork. The depth is consistent because the hard material from which the brace is composed prohibits countersinking.

The system of the present invention is also superior to the use of a backer board because the flange-screw combination permits improved interattachment of the components.

Finally, the present system is superior to the bracket and bolt system because of simplicity. In addition, the present system is superior over the bracket system because it will not flex or bend as is possible with the bracket, and, in addition, the present system does not require supplemental adjustment as required with the bracket system. Perhaps most importantly, the present system permanently fastens the joist and subfloor together, while the bracket system, which relies on a "pulling" system, becomes loose over time and may even buckle.

Finally, the present system is superior to the known systems because it can be used on joists even if the joist is a wall of a cold air return.

Other advantages and features of the present invention will become more apparent as the description proceeds.

BRIEF DESCRIPTION OF THE DRAWINGS

The present invention will be more fully understood by reference to the following detailed description of the preferred embodiment when read in conjunction with the accompanying drawings, in which like characters refer to like parts throughout the views, and in which.

DETAILED DESCRIPTION OF THE PREFERRED EMBODIMENT OF THE PRESENT INVENTION

The drawings disclose the preferred embodiment of the present invention. While the configuration according to the illustrated embodiment is preferred, it is envisioned that alternate configurations of the present invention may be adopted without deviating from the invention as portrayed.

The preferred embodiment is discussed hereafter.

Figure 1:
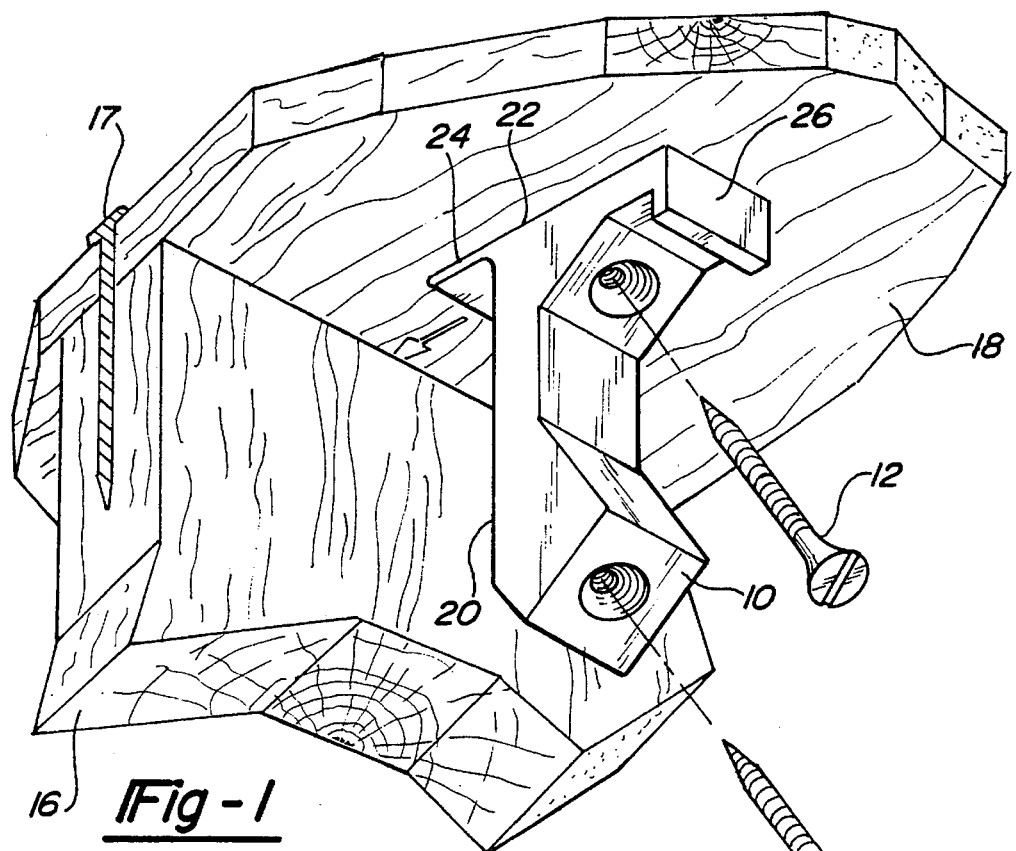
FIG. 1 is a perspective view of the system of the present invention shown in exploded view in relation to a floor and an underlying joist.

FIG. 1 shows a perspective view of the system of the present invention. The system comprises a brace 10 and a first fastener 12 and a second fastener 14. The brace 10 is preferably composed of a metal such as steel or aluminum, although it can conceivably be composed of an alternate material such as a plastic or other polymerized material.

The view of the FIG. 1 illustrates the brace 10 prior to insertion between a first member 16 and a second member 18. A nail 17 is shown to illustrate the conventional method of attaching the second member 18 to the first member 16. It can accordingly be seen how the head of the nail 17 may easily pull the shank of the nail 17 up from the floor over time.

The system of the present application has particular utility in application for the elimination of squeaks between joists and an overlying subfloor and for the reinforcement of weak or "spongy" floors to thereby eliminate movement of the subfloors relative to the joists. Accordingly, as portrayed in FIG. 1, the joist would be the first member 16 and the subfloor would be second member 18. However, it should be clear from the illustration and from the present explanation that the system of the present invention finds application in any situation where it is desired to interlock two substantially perpendicular members.

There are illustrated a pair of fasteners, the first fastener 12 and the second fastener 14. It should be understood, however, that a greater or lesser number of fasteners may be used alternatively. Nevertheless, the preferred number of fasteners is two, this number being shown to provide the necessary adhesive force while providing the minimum number of parts.

Preferably the fasteners 12, 14 are screws. Other fasteners, such as bolts being driven into a threaded receptacle inserted into the members 16, 18, may also be used. However, it is believed that the present system provides maximum strength and convenience.

As is shown, the brace 10 includes a pair of working surfaces, a first working surface 20, and a second working surface 22. The first working surface 20 abuts the first member 16, or the joist, and the second working surface 22 abuts the second member 18, or the subfloor. A flange 24 extends from the first working surface 20. The flange 24 is insertable between the top side of the first member 16 and the bottom side of the second member 18. The thickness of the flange 24 may be continuous, or the flange 24 may be wedge-shaped. This latter shape may be a "controlled" wedge that can be tapered to very exacting specifications and may be very thin. This is possible because of the metal or polymerized composition of the brace 10. Conventional wooden wedges cannot have "controlled" tapers because the wood tends to splinter.

An arrow is provided in FIG. 1 to illustrate the direction of movement of the brace 10 for insertion between the members 16, 18. This direction of movement is the direction the brace 10 is moved when the brace 10 is installed between the members 16, 18. It is very likely that the flange 24 will not easily slip between the components 16, 18 without applying force to the brace 10. Accordingly, the brace 10 is provided with an anvil end 26. If the installer encounters difficulty on the insertion of the brace 10, a hammerhead (not shown) may be applied against the anvil end 26 to facilitate insertion.

Figure 2:
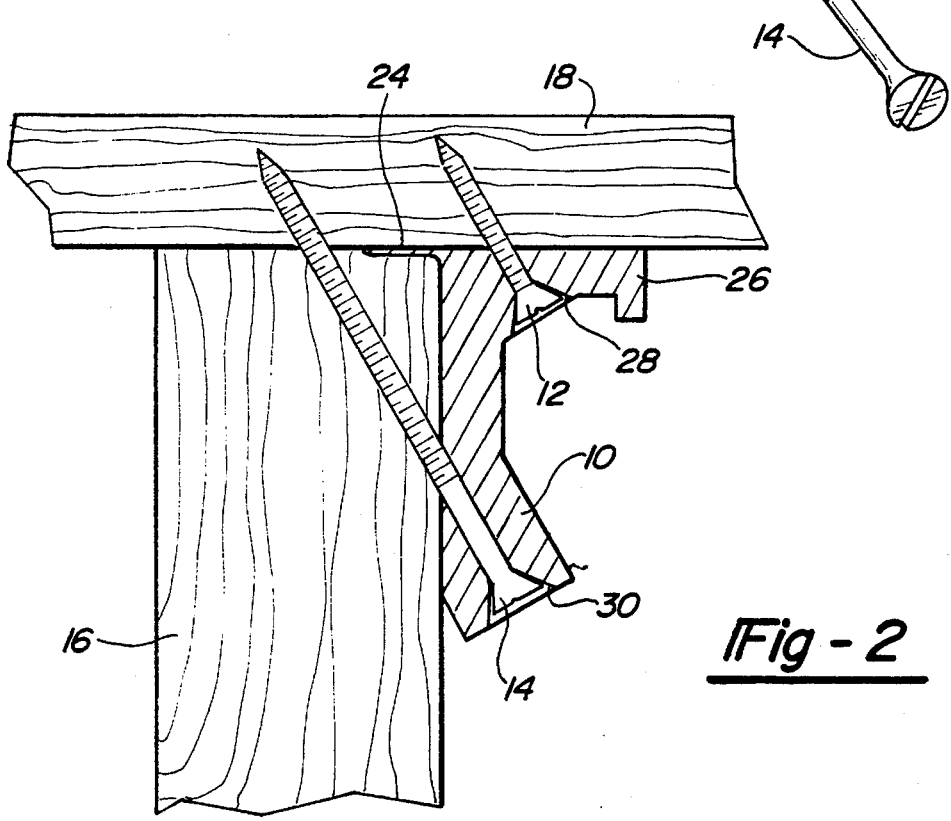
FIG. 2 is a sectional view through the perpendicular members and the brace and fasteners.

FIG. 2 illustrates a view of the brace 10 in place with respect to interconnecting members 16, 18. This view shows the brace 10, the fasteners 12, 14, and the members 16, 18 in crosssection. As may be seen, the flange 24 is disposed snugly between the top side of the first member 16 and the bottom side of the second member 18. The wood of the top side of the first member 16 adjacent the flange 24 has been compressed somewhat to accommodate the flange 24. If the wood of the first member 16 is not compressible or is only minimally compressible, the subfloor will be raised a marginal amount, or the thickness of the flange 24.

The first fastener 12 is provided in a first pilot hole 28 and the second fastener 14 is provided in a second pilot hole 30. The fastener insert ends of the holes 28, 30 are countersunk to accommodate the heads of the fasteners 12, 14. The holes 28, 30 are provided substantially parallel to one another as illustrated to provide maximum fastening strength. In addition, the holes 28, 30 are provided at an acute angle relative to the plane of the first working surface 20. The preferred angle is about 30 degrees, although variations of this are certainly foreseeable.

As may be seen, the fasteners 12, 14 are of different lengths, with the first fastener 12 being shorter than the second fastener 14. In addition, one of the fasteners may be wider than the other and the bore of its respective pilot hole likewise may be wider. This difference is provided so that the user will not confuse one fastener with the other upon installation. If the fasteners 12, 14 were interchanged, the longer fastener 14 would easily pass through the upper surface of the second member 18, and because the second member 18 would probably be a subfloor, the tip of the fastener 14 would most likely pass through the tile or carpeting and cause injury.

The reason behind the difference in length of the fasteners is that maximum attachment can be best achieved if the first fastener 12 goes through the brace 10 and into the second member 18 (without passing through the upper surface thereof) while the second fastener 14 also goes through the brace 10, through the first member 16, and into the second member 18 (again without passing through the upper surface thereof). While the fastener 12 is always shorter than the fastener 14, the lengths of the fasteners 12, 14 may be otherwise varied according to the overall length of the brace 10. But in any event, the length of each of the fasteners 12, 14 is always a predetermined length according to the length of the brace. This mating eliminates the guesswork that would otherwise be necessary on the part of the installer.

As may be seen, the fastener entrance ends of the pilot holes 28, 30 are disposed through parallel surfaces, yet are substantially provided one atop the other when viewed in cross-section.

As mentioned above, the initial step in installing the brace 10 is to fit the flange 24 between the first and second members 16, 18 respectively. A hammer (not shown) is used against the anvil end 26 as may be necessary for insertion. Once tentatively in place, the installer attaches the first fastener 12, which draws the working surfaces 20, 22 of the brace 10 against the corner created by the juncture of the two members 16, 18. Because the first fastener 12 enters the second member 18, it is held more tightly thereto than to the first member 16. The first fastener 12, therefore, holds the brace 10 in place during installation. The second fastener 14 is then installed, and this fastener aids in pulling the second member 18 and the first member 16 together as the fastener 14 is tightened.

In the event that the second fastener 14 failed to pull the first member 16 and the second member 18 together, the angle and depth of the fastener 14 would prevent the second member 18 from moving either up or down relative to the first member 16. This static relationship would prevent the squeaking of the two components in any event.

The placement of the pilot holes 28, 30 through the brace 10 offers several advantages. First, as may be seen, because the fasteners enter the members 16, 18 at angles relative to their surfaces, considerable attachment strength is achieved. Second, and with respect to the placement of the second fastener 14, the fastener is disposed at an angle such that when the fastener 14 exits the first member 16, it does so at the approximate mid-point of the top side. This positioning minimizes splintering. Third, and still with respect to the second fastener 14, even if a plywood seam were to be located in the second member 18 above the first member 16, the fastener 14 still has sufficient contact with the second member 18 so as to bond it to the first member 16. Fourth, and with respect to the first fastener 12, the angle of the fastener 12 (which is installed first) is such that the fastener 12 actually draws the brace 10 into snug contact with the underside of the second member 18 as described above.

With the brace 10 secured in the position as shown in FIG. 2 and described with respect thereto, the system of the present invention becomes an important part of the structure.

Figure 3:
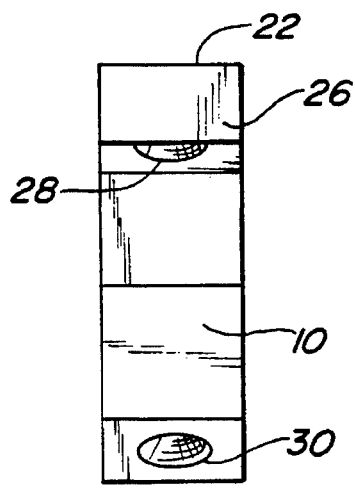
FIG. 3 is a first end view of the brace of the present invention.
Figure 4:
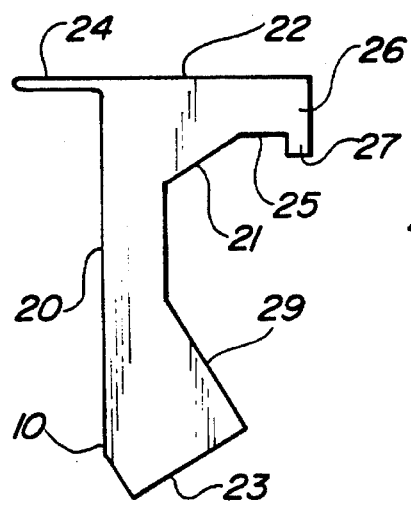
FIG. 4 is a side view of the brace.
Figure 5:
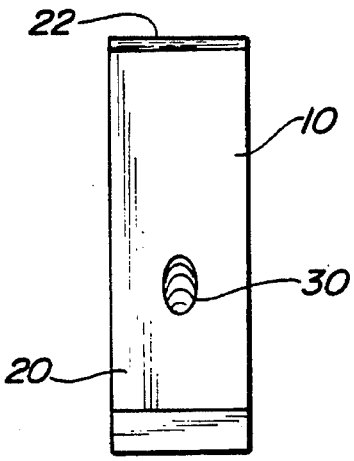
FIG. 5 is a second end view of the brace of the present invention.

FIGS. 3, 4 and 5 illustrate front, side and back views of the brace 10 according to the present invention. With specific reference to FIG. 3, the front view is shown to illustrate the brace 10 as preferably having a constant width from top to bottom. A recommended width for the brace 10 is ¾", although any width may be suitable as long as the width is sufficient to provide support for the floor and the pilot holes 28, 30. FIG. 3 also illustrates the relative positions of the pilot holes 28, 30.

FIG. 4 is a side view of the brace 10 and clearly illustrates the outline of the body of the brace 10. Of course, other variations of this shape may be used. Such variations may include additional body size to accommodate an extra fastener, or alternative placement of the entrances for the pilot holes.

FIG. 4 also illustrates a first fastener surface 21 through which the first fastener 12 is inserted and a second fastener surface 23 through which the second fastener 14 is inserted. Adjacent the first fastener surface 21 is an adjacent surface 25. A downwardly extending lip 27 extends from the anvil end 26. Adjacent the second fastener surface 23 is a side surface 29. This preferred construction defines a pocket within which the chuck of a power drill (not shown) may easily fit.

FIG. 5 is a back view of the brace 10 illustrating its preferred configuration. The exit end of the pilot hole 30 is clearly seen on the face of the first working surface 20. At this distance from the flange 24, the exit end of the pilot hole 30 allows the second fastener 14 to enter the first member 16 at such a place so as to have it exit the top of the first member 16 at its approximate mid-point.

Figure 6:
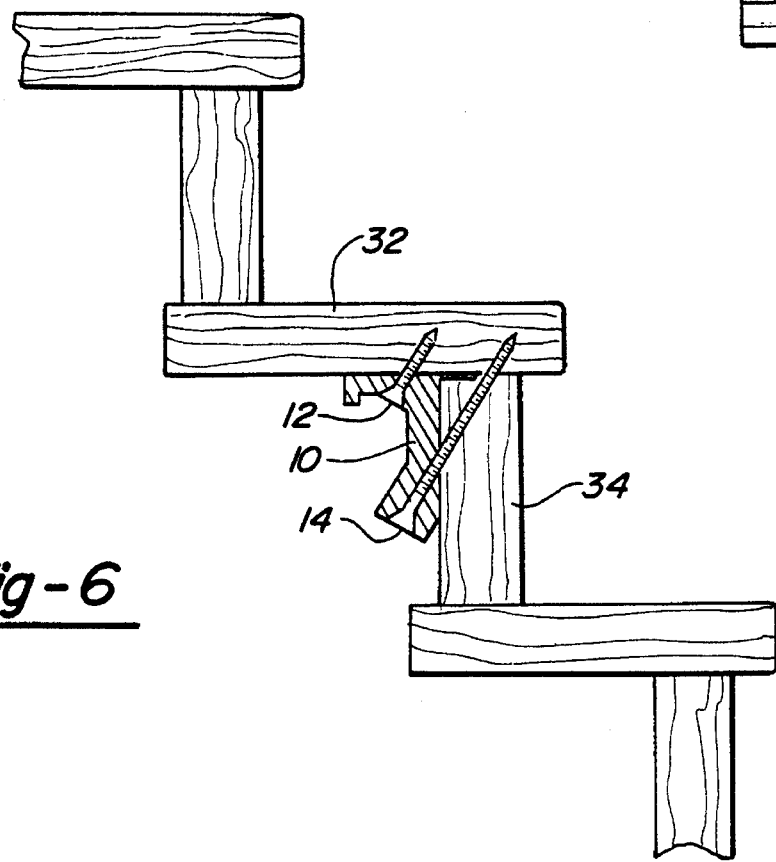
FIG. 6 is a sectional view through the brace and an alternate set of perpendicular members.

FIG. 6 illustrates an alternate application of the brace 10. While FIGS. 1 and 2 generally relate to the use of the brace 10 to join a joist and a subfloor together, FIG. 6 shows one of many other uses of the system of the present invention. Specifically, the brace 10 is shown installed at the interior juncture of a tread 32 and a riser 34. The use of the system in this application is to bring the tread 32 and the riser 34 in as close contact as possible to prevent squeaking. The system of the present invention may find use in any such application where the end of one component is to be securely attached to one side of another component.

Having described my invention, however, many modifications thereto will become apparent to those skilled in the art to which it pertains without deviation from the spirit of the invention as defined by the scope of the appended claims.

I claim:

1. A system for drawing first and second substantially perpendicular components together, said first component having a top, said first and second components each having a side, said system comprising:

a brace, said brace having a first working surface for mating with the side of the first component and a second working surface for mating with the side of the second component, said first working surface substantially defining a planar surface;

said brace including a flange extending from said first working surface, said flange being disposable between the top of the first component and the side of the second component, said flange having a first working surface, said first working surface of said flange and said second working surface of said brace being substantially coplanar; and fastening means for attaching said components and said brace together, said fastening means comprising first and second fasteners extending through said brace, said first and second fasteners being substantially parallel.

2. The system of claim 1 wherein said first and second working surfaces are disposed at right angles to each other.

3. The system of claim 1 wherein said first and second fasteners are screws.

4. The system of claim 1 wherein said brace has defined therein a first pilot hole for receiving said first fastener, said first pilot hole being disposed at an acute angle relative said first working surface.

5. The system of claim 4 wherein said first pilot hole terminates at said first working surface.

6. The system of claim 1 wherein said brace has defined therein a second pilot hole for receiving said second fastener.

7. The system of claim 6 wherein said second pilot hole terminates on said second working surface.

8. The system of claim 1 wherein said second pilot hole is parallel with said first pilot hole.

9. The system of claim 1 wherein said first fastener is fastened to said first component.

10. The system of claim 1 wherein said flange has an inserting edge, said inserting edge defining a radius.

11. The system of claim 1 further including first and second pilot holes for said fasteners, each of said first and second pilot holes having a fastener receiving end, said end being countersunk.

12. The system of claim 11 wherein said first and second pilot holes are of different diameters.

13. A system of drawing first and second substantially perpendicular components together, said first component having a top, said first and second components each having a side, said system comprising:

a brace, said brace having a body, said body including a first portion and a second portion, said first and second portions being substantially perpendicular to each other, said first portion having a hole for a first fastener, said second portion having a hole for a second fastener, said hole of said first portion being substantially parallel said hole of said second portion, said first portion having a first working surface for mating with said side of said first component, said first working surface having an upper end and a lower end, said first working surface defining a substantially planar surface between said upper end and said lower end, said second portion having a second working surface for mating with said side of said second component, said second working surface being substantially planar;

said brace including a flange extending from said first working surface, said flange being disposable between the top of said first component and said side of said second component, said flange having an upper surface and a lower surface, said upper surface of said flange substantially defining a planar surface, said upper surface of said flange and said second working surface of said brace being substantially coplanar, said lower surface having a first end and a second end, said second end of said flange intersecting said upper end of said substantially planar first working surface;

a first fastener positioned through said hole of said first portion for attachment between said first portion and said first component; and a second fastener positioned through said hole of said second portion for attachment between said second portion and said second component, said first and second fasteners being substantially parallel.

14. A system for drawing first and second substantially perpendicular components together, the first component having a top, the first and second components each having a side, said system comprising:

a brace, said brace having a first working surface for mating with the side of the first component and a second working surface for mating with the side of the second component;

a first fastener extending through said second working surface of said brace for exerting a first pulling force on the second component; and a second fastener means extending through said first working surface of said brace for exerting a second pulling force on the first and second components said first and second fasteners being substantially parallel.

15. The system of claim 14 wherein said brace has defined therein a pair of pilot holes for said first and second fasteners said pilot holes being substantially parallel to one another.

16. The system of claim 14 wherein said brace further includes a flange extending from said first working surface, said flange being disposable between said top of first component and said side of second component, said flange having a first working surface.

17. The system of claim 16 wherein said first working surface of said flange substantially defines a planar surface.

18. The system of claim 17 wherein said first working surface of said flange and said first working surface of said brace are substantially coplanar.

19. The system of claim 18 wherein said flange substantially fills space between said side of first component and said side of said second component.

* * * * *